United States Patent
Son

(10) Patent No.: US 11,010,037 B2
(45) Date of Patent: May 18, 2021

(54) DISPLAY DEVICE AND OPERATING METHOD THEREOF

(71) Applicant: LG ELECTRONICS INC., Seoul (KR)

(72) Inventor: Chulmin Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/341,666

(22) PCT Filed: Oct. 12, 2016

(86) PCT No.: PCT/KR2016/011444
§ 371 (c)(1),
(2) Date: Apr. 12, 2019

(87) PCT Pub. No.: WO2018/070563
PCT Pub. Date: Apr. 19, 2018

(65) Prior Publication Data
US 2019/0384470 A1    Dec. 19, 2019

(51) Int. Cl.
*G06F 3/0485* (2013.01)
*H04L 29/08* (2006.01)

(52) U.S. Cl.
CPC .......... *G06F 3/0485* (2013.01); *H04L 67/10* (2013.01)

(58) Field of Classification Search
CPC ..... G06F 3/0485; G06F 3/04842; H04L 67/02
See application file for complete search history.

(56) References Cited

U.S. PATENT DOCUMENTS

| 6,182,133 | B1 * | 1/2001 | Horvitz ............... G06F 16/9574 709/223 |
| 8,074,249 | B2 * | 12/2011 | Shikata .............. H04N 21/4755 725/110 |
| 9,377,940 | B2 * | 6/2016 | McAllister ............ G06F 3/0485 |
| 9,559,976 | B2 * | 1/2017 | Peterson ................. H04L 47/70 |

(Continued)

FOREIGN PATENT DOCUMENTS

| CN | 104965659 | 10/2015 |
| CN | 105022655 | 11/2015 |

(Continued)

OTHER PUBLICATIONS

PCT International Application No. PCT/KR2016/011444, International Search Report dated Jul. 14, 2017, 4 pages.

(Continued)

*Primary Examiner* — Daeho D Song
(74) *Attorney, Agent, or Firm* — Lee, Hong, Degerman, Kang & Waimey

(57) ABSTRACT

A display device according to the present invention is an invention for smoothly and quickly displaying a large-capacity web page, wherein the display device comprises: a user input interface unit for receiving a web page access command, a display unit for displaying one area of a web page, a network interface unit for receiving resources related to a current web page area, a storage unit for storing received resources, and a control unit for controlling the device so as to receive a scroll command and so as to receive resources related to the current web page area changed in accordance with the scroll command.

10 Claims, 18 Drawing Sheets

(56) References Cited

U.S. PATENT DOCUMENTS

| | | | |
|---|---|---|---|
| 9,965,162 B2* | 5/2018 | Hauser | G06F 3/0485 |
| 2002/0054043 A1* | 5/2002 | Nishiyama | G06T 11/203 |
| | | | 345/441 |
| 2004/0027601 A1* | 2/2004 | Ito | H04N 1/32069 |
| | | | 358/1.13 |
| 2004/0203959 A1* | 10/2004 | Coombes | H04M 1/72552 |
| | | | 455/466 |
| 2004/0214611 A1 | 10/2004 | Jong et al. | |
| 2005/0154781 A1* | 7/2005 | Carlson | G06F 16/9574 |
| | | | 709/203 |
| 2007/0233748 A1* | 10/2007 | Chang | G06F 16/957 |
| 2008/0092078 A1* | 4/2008 | Takeshima | G06F 3/0485 |
| | | | 715/786 |
| 2008/0126314 A1* | 5/2008 | Thorn | H04L 61/30 |
| 2009/0252311 A1* | 10/2009 | Kuiken | G08C 17/00 |
| | | | 379/102.02 |
| 2010/0131441 A1* | 5/2010 | Gruenhagen | G06F 16/9535 |
| | | | 706/45 |
| 2011/0084899 A1* | 4/2011 | Jung | H04N 21/42204 |
| | | | 345/156 |
| 2011/0202847 A1 | 8/2011 | Dimitrov | |
| 2012/0049998 A1* | 3/2012 | Lim | A61B 5/6898 |
| | | | 340/1.1 |
| 2012/0256949 A1 | 10/2012 | Treat et al. | |
| 2012/0266068 A1* | 10/2012 | Ryman | G06F 9/452 |
| | | | 715/719 |
| 2012/0272136 A1* | 10/2012 | Takami | G06F 16/9535 |
| | | | 715/234 |
| 2012/0278742 A1* | 11/2012 | Takami | H04L 67/22 |
| | | | 715/760 |
| 2012/0293559 A1* | 11/2012 | Tomaru | G09G 5/34 |
| | | | 345/684 |
| 2013/0111397 A1* | 5/2013 | Miyoshi | G06F 16/9577 |
| | | | 715/784 |
| 2013/0174096 A1 | 7/2013 | Lewin | |
| 2013/0238433 A1* | 9/2013 | Kamdar | G06Q 30/0241 |
| | | | 705/14.53 |
| 2014/0033019 A1* | 1/2014 | Zhang | G06F 40/14 |
| | | | 715/234 |
| 2014/0089110 A1* | 3/2014 | Kazama | G06Q 30/0272 |
| | | | 705/14.73 |
| 2014/0092084 A1* | 4/2014 | Sun | G06T 11/20 |
| | | | 345/418 |
| 2014/0189558 A1* | 7/2014 | Takami | G06F 3/04842 |
| | | | 715/767 |
| 2014/0208259 A1* | 7/2014 | Desai | G06F 3/0485 |
| | | | 715/784 |
| 2014/0292760 A1* | 10/2014 | Shikolay | G06F 3/0485 |
| | | | 345/428 |
| 2015/0058114 A1* | 2/2015 | Yi | G06Q 30/0242 |
| | | | 705/14.41 |
| 2015/0088667 A1* | 3/2015 | Suzuki | G06F 3/0485 |
| | | | 705/14.73 |
| 2015/0234561 A1* | 8/2015 | Kashima | G06F 16/957 |
| | | | 715/784 |
| 2015/0324376 A1* | 11/2015 | Jeon | G06F 16/957 |
| | | | 715/234 |
| 2016/0179328 A1* | 6/2016 | Yang | G06F 3/0488 |
| | | | 715/863 |
| 2016/0328108 A1* | 11/2016 | Li | G06F 3/0485 |
| 2017/0024423 A1* | 1/2017 | Liang | G06F 16/215 |
| 2018/0121935 A1* | 5/2018 | Mori | G06Q 30/02 |

FOREIGN PATENT DOCUMENTS

| | | |
|---|---|---|
| EP | 2357575 | 8/2011 |
| EP | 2508986 | 10/2012 |
| KR | 10-2004-0091987 | 11/2004 |
| KR | 10-2011-0125285 | 11/2011 |
| WO | 2011078621 | 6/2011 |
| WO | 2012141412 | 10/2012 |
| WO | 2016053130 | 4/2016 |

OTHER PUBLICATIONS

Korean Intellectual Property Office Application No. 10-2019-7004962, Office Action dated Feb. 17, 2020, 39 pages.
The State Intellectual Property Office of the People's Republic of China Application Serial No. 201680089984.2, Office Action dated Sep. 27, 2020, 9 pages.
European Patent Office Application Serial No. 16918466.0, Search Report dated Oct. 20, 2020, 9 pages.

* cited by examiner

DISPLAY DEVICE AND OPERATING METHOD THEREOF

CROSS-REFERENCE TO RELATED APPLICATIONS

This application is the National Stage filing under 35 U.S.C. 371 of International Application No. PCT/KR2016/011444, filed on Oct. 12, 2016, the contents of which are hereby incorporated by reference herein its entirety.

TECHNICAL FIELD

The present invention relates to a display device and a method of operating the same.

The present invention relates to a display device and a method of operating the same, and more particularly, to an invention to smoothly and rapidly display a large-capacity webpage in a display device having a limited main memory.

BACKGROUND ART

Recently, a digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

In particular, when a display device, such as a TV, provides Internet search or web shopping services, the display device downloads all the resources included in the webpage from a web server as soon as the user accesses the webpage.

However, recently, webpages providing Internet search or web shopping services often contain dozens to hundreds of large image files. Accordingly, when a display device having a smaller capacity of memory is connected with a webpage including large-capacity image files, the webpage is frequently forcibly terminated due to the insufficient memory.

One of the conventional techniques to solve such a problem is a method for dynamically interworking with a web server while downloading only resources to be additionally displayed on a webpage instead of simultaneously downloading all the resources included in a webpage at a time. However, such a case may shorten only the time for loading the first page, and not prevent the memory shortage due to the continuous loading of the webpage.

DISCLOSURE

Technical Problem

The present invention is suggested to solve the above problem, and to provide a display device and a method of operating the same, capable of smoothly accessing a webpage and displaying the webpage such that the load is not applied, when a large-capacity webpage is displayed on the display device having a smaller-capacity memory.

Technical Solution

According to an embodiment of the present invention, a display device may include a user input interface unit to receive a webpage connection command, a display unit to display one area of the webpage in response to the webpage connection command, a network interface unit to receive resources associated with a current webpage area including a display area of the webpage, a storage unit to store the received resources, and a control unit to receive a scroll command, to change the current webpage area in response to the scroll command, and to control the network interface unit to receive resources associated with the changed current webpage area. The current webpage area includes the predetermined number of pixel areas including the display area, and an area before and after the display area. Accordingly, since only resources associated with the webpage displayed currently on the display unit, the speed of receiving the resources is increased, thereby rapidly displaying the webpage.

According to an embodiment of the present invention, in the display device, the control unit may perform a control operation to delete resources, which are not included in the current webpage, of the resources stored in the storage unit. Therefore, a large-capacity webpage may be smoothly displayed even by a display device including a small capacity storage unit.

According to an embodiment of the present invention, in the display device, the control unit may determine whether the resources, which are not included in the current webpage area, are stored in the storage unit, in a predetermined period. This is to allow the display device to continuously receive the scroll command and to determine whether all necessary resources are received in response to the received scroll command.

According to an embodiment of the present invention, in the display device, the control unit may calculate the speed of the scroll command and may determine the period based on the speed of the scroll command. In detail, the control unit may change the period to be shortened when the speed of the scroll command is equal to or greater than a preset speed, and changes the period to be lengthened when the speed of the scroll command is less than the preset speed. This is to rapidly display the resources on the screen by reflecting the speed of changing the webpage display area of the user According to an embodiment of the present invention, in the display device, the control unit may calculate the speed of the scroll command and may determine the range of the current webpage area based on the speed of the scroll command. In detail, the control unit may expand the range of the current webpage area when the speed of the scroll command is equal to or greater than a preset speed, and may reduce the range of the current webpage area when the speed of the scroll command is less than the preset speed. This is to efficiently receive the resources by reflecting the speed of changing the webpage display area of the user According to an embodiment of the present invention, in the display device, the speed of the scroll command may include a movement speed of a remote control unit to change the current webpage area.

According to an embodiment of the present invention, in the display device, the control unit may determine whether the storage unit stores all the resources associated with the current webpage area, in a predetermined period. This is to prevent the webpage from being properly displayed as the necessary resources are not received.

According to an embodiment of the present invention, in the display device, the control unit may receive resources by re-determining the current webpage area when it is not determined that the storage unit stores all the resources associated with the current webpage area, and may display the display area by using the resources when itis determined the storage unit stores all the resources associated with the current webpage area.

Advantageous Effects

According to various embodiments of present invention, even when the display device is equipped with a small-capacity memory, it is possible to smoothly access a large-capacity webpage and to rapidly display image files included in the webpage.

According to various embodiments of the present invention, it is possible to efficiently use and manage a memory space provided in a display device.

According to various embodiments of the present invention, it is possible to prevent the problem of shortening the life span of the memory, which may occur by repeatedly downloading a large capacity of data.

BEST MODE

Mode for Invention

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

The display device according to an embodiment of the present invention, which is an intelligent display device that adds a computer aid function to a broadcast receiving function, for example, and is equipped with an more convenient interface for, for example, a handwriting input device, a touchscreen, or a space remote control. In addition, the display device is connected with the Internet and a computer as a wired or wireless Internet function is supported. Accordingly, a function, such as an e-mail, a web browsing function, a banking function, or a game playing function, may be performed. For various functions, a standardized general-purpose OS may be used.

Therefore, the display device described in the present invention may perform various user-friendly functions since various applications are freely added or deleted on a general-purpose OS kernel. In more detail, the display device may include a network TV, an HBBTV, a smart TV, an LED TV, an OLED TV, or the like. Accordingly, the display device is applicable even to a smartphone if necessary.

Figure 1:
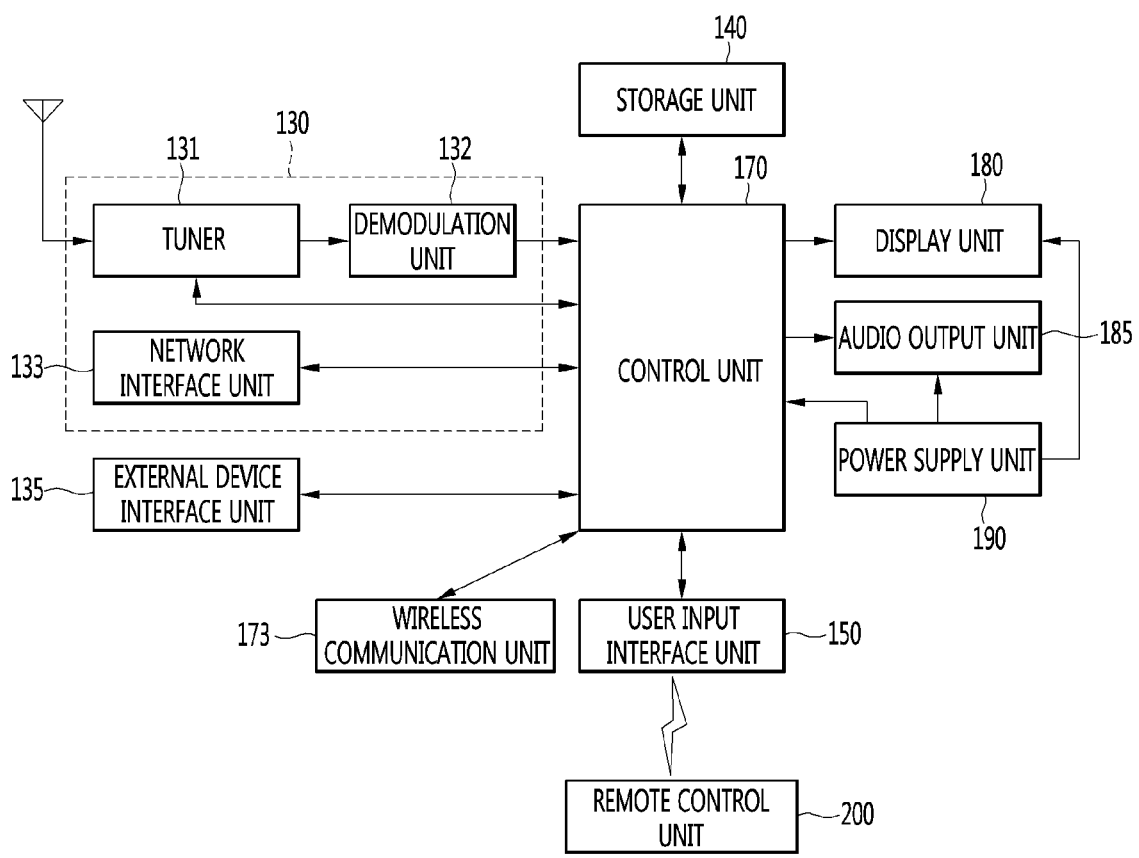
FIG. 1 is a block diagram illustrating the configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface 135 can provide a connection path between the display device 100 and an external device. The external device interface 135 can receive at least one of image and audio outputted from an external device that is wirelessly or wiredly connected to the display device 100 and deliver it to the control unit 170. An external device connectable to the external device interface unit 135 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

Device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals outputted from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Bluetooth Low Energy (BLE), Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be outputted to the audio output unit 185. Additionally, voice signals processed in the control unit 170 can be inputted to an external output device through the external device interface unit 135.

Besides that, the control module 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or OSD signals, which are processed in the control unit 170, or images signals or data signals, which are received in the external device interface unit 135, into R, G, and B signals to generate driving signals.

One embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
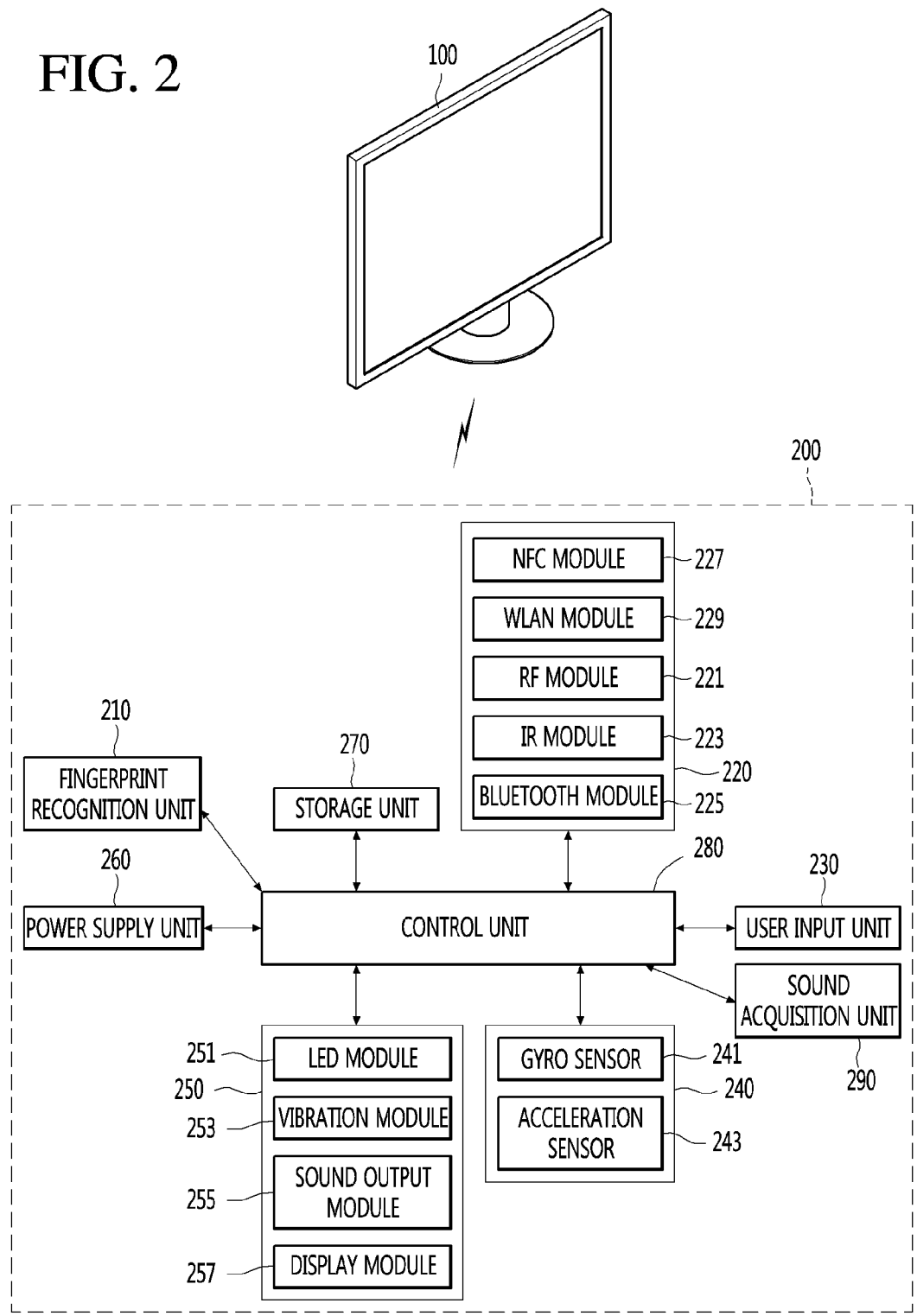
FIG. 2 is a block diagram illustrating a remote control device according to an embodiment of the present invention.
Figure 3:
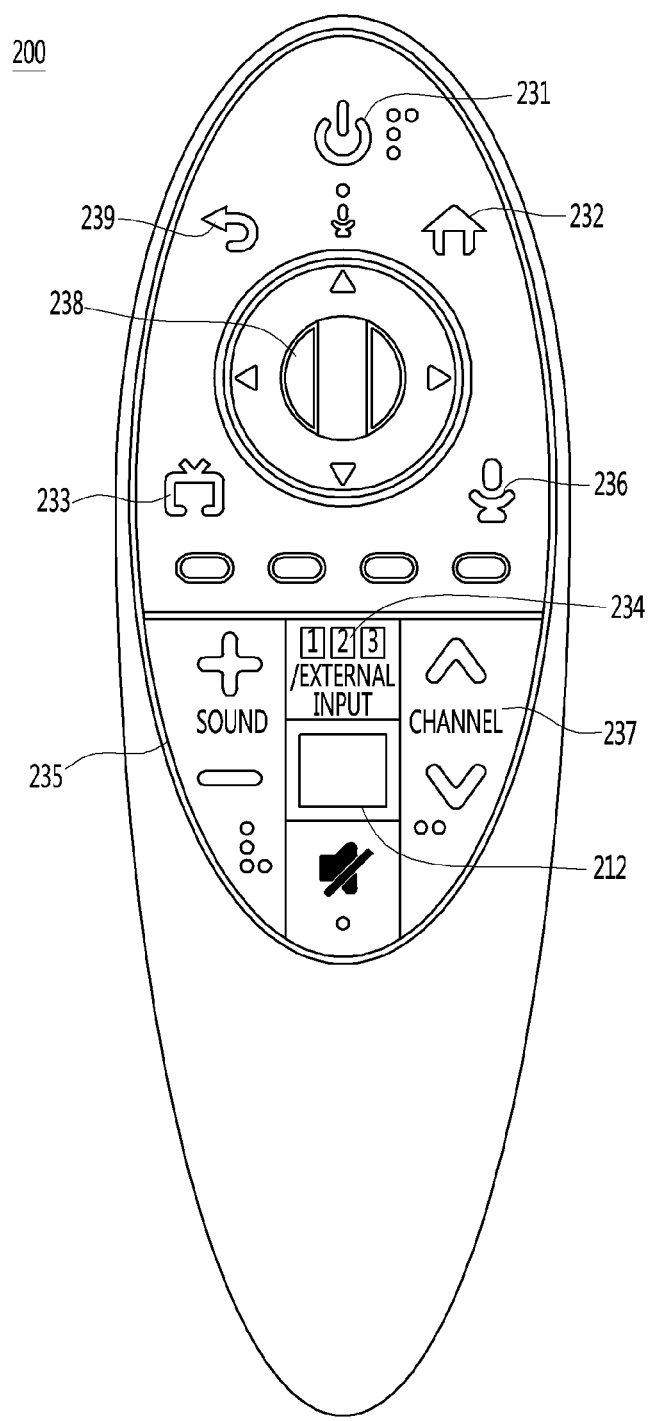
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
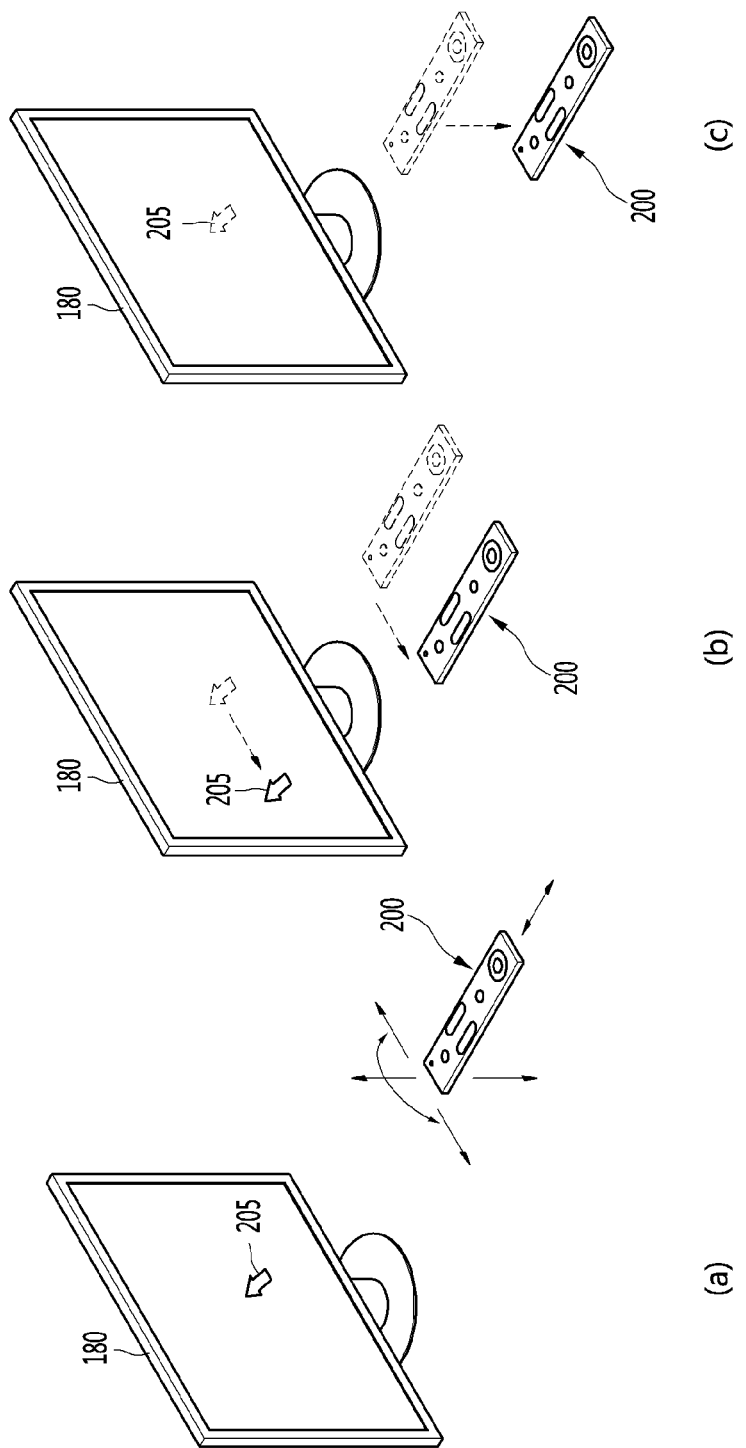
FIG. 4 is a view illustrating an example of utilizing a remote control device according to an embodiment of the present invention.

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

Vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5A:
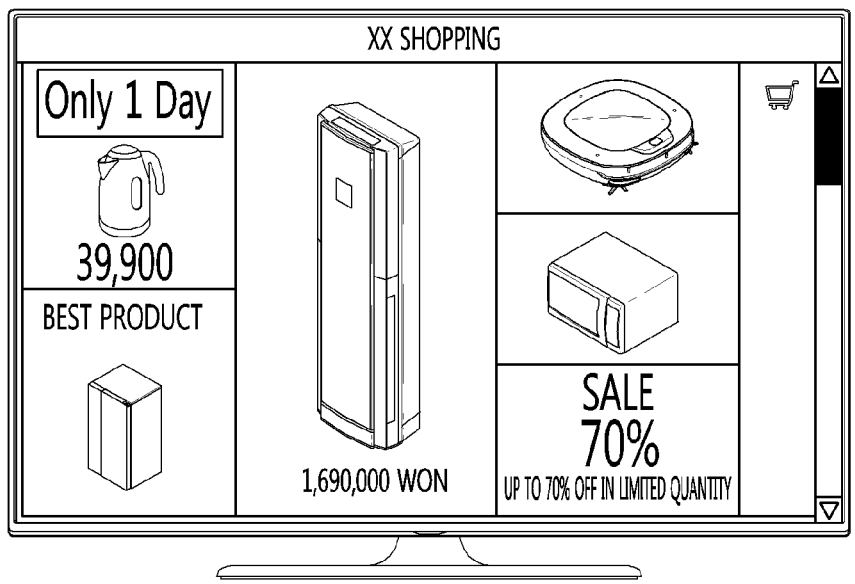
FIGS. 5A and 5B are views illustrating a method in which a conventional display device displays a webpage on a screen in response to a webpage display command.
Figure 5B:

Hereinafter, a method that a conventional display device 100 displays a screen in response to a webpage display command will be described with reference to FIGS. 5A to 5B. FIGS. 5A and 5B are views illustrating a method that the conventional display device displays a webpage on a screen in response to the webpage display command.

The control unit 170 may receive a webpage connection command. Accordingly, the control unit 170 may control the display unit 180 to display a webpage in response to the received command. For example, as illustrated in FIG. 5A, the control unit 170 may control to display any one of webpages constituting a shopping site on the display unit 180. The webpage according to the received command may include a plurality of large-capacity image files as illustrated in FIG. 5A. Accordingly, it may take a long time for the control unit 170 to receive the image files included in the webpage from the server and to display the image files on the display unit 180. In addition, the control unit 170 may be overloaded while receiving the image files included in the webpage, thereby causing a problem that the operation currently being performed is forcibly terminated. In this case, the display unit 180 may display a screen 601 for forcibly terminating as illustrated in FIG. 5B. The forcibly terminating screen 601 may include a wording indicating that the webpage according to the current command may not be displayed, and a 'refresh' icon. The control unit 170 controls the display unit 180 to display the forcibly terminating screen 601 so that the display device 100 may not provide a service in response to the command of the user.

The following description will be made regarding a method of operating a display device, according to an embodiment of the present invention, enabling the display device 100 having a low-capacity memory to smoothly or rapidly display a webpage including large-capacity image files, so as to solve the above problems.

Figure 6:
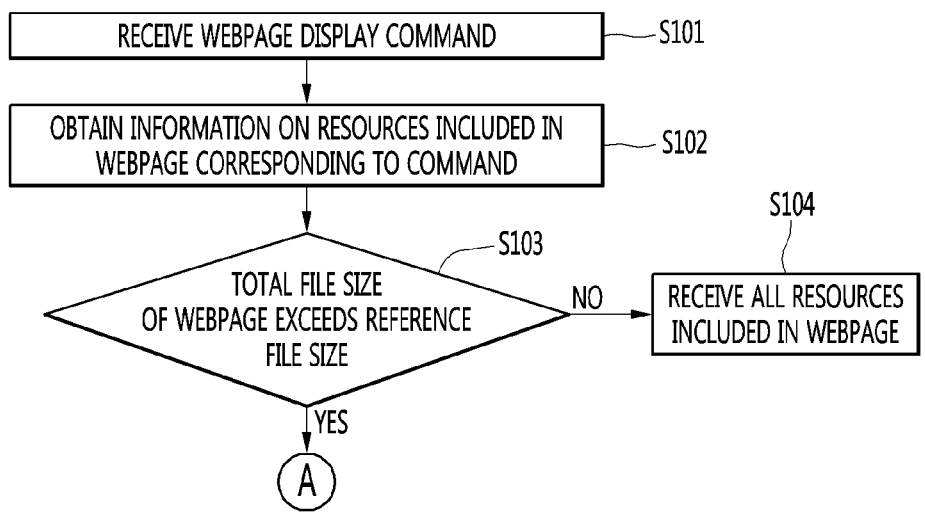
FIG. 6 is a flowchart illustrating a method of operating the display device according to an embodiment of the present invention.

FIG. 6 is a flowchart illustrating a method of operating the display device according to an embodiment of the present invention The control unit 170 of the display device 100 receives a webpage display command (S101).

The webpage display command may be received from the user through the user input interface unit 150. The control unit 170 may receive the webpage display command through the user input interface unit 150. The webpage display command may include a webpage connection command. A webpage is a collective term of web documents on the Internet, and may be a web document constituting a search portal site, a shopping site, or a social network service (SNS).

The webpage may include resource files such as a text file, a picture file, a sound file, and a video file. The whole file size of the webpage may vary depending on the text file, the picture file, the sound file, or the video file constituting the webpage. Therefore, it takes a lot of time to display a webpage mainly containing a large-capacity picture or a moving picture file, and it takes a less time to display a webpage mainly containing a small-sized text or sound file.

The control unit 170 may receive a command to display, on the display unit 180, any one of webpages mutually different in the whole file size.

The control unit 170 acquires information of resources included in a webpage corresponding to the received command (S103).

The control unit 170 may control the network interface unit 133 to receive all the resources included in the webpage from the server to acquire the information of the resources included in the webpage. A resource may refer to a text file, a picture file, a sound file, and a moving picture file that constitute the webpage.

The control unit 170 may acquire the file size of each resource and the file size of the entire webpage based on the received resources. In addition, the control unit 170 may acquire size information occupying a screen with respect to each resource. This is for the control unit 170 to calculate relative coordinates for the arrangement of each resource based on the resolution of the display device 100.

The control unit 170 may delete all the resources from the storage unit 140 after acquiring the information of the resources included in the webpage. This is to acquire only the information on the resources included in the webpage to improve the display speed of the webpage, and then receive only necessary resources later, when the display device according to the embodiment of the present invention accesses the webpage. Accordingly, the control unit 170 may perform a control operation to delete the resources stored in the storage unit 140 when the information of the resources is acquired.

The control unit 170 may determine whether the whole file size of the webpage exceeds the reference file size (S103).

The control unit 170 may calculate the whole file size of the webpage based on the file size of each resource included in the webpage. The control unit 170 may determine whether the whole file size of the webpage exceeds the reference file size.

The reference file size may refer to a criterion for determining whether to simultaneously receive all the resources included in the webpage or to receive the resources by dividing the resources based on the screen display area.

The reference file size may be set to a default value. The reference file size may vary depending on the performance of the display device 100. As the performance of the display device 100 is more excellent, the reference file size may be set to be larger. For example, in the case of the display device 100 having a RAM size of 300 MB, the reference file size may be 100 MB, and in the case of the display device 100 having a RAM size of 400 MB, the reference file size may be 200 MB. However, this is provided for the illustrative purpose, but the present invention needs not be limited thereto.

When the control unit 170 determines that the whole file size of the webpage does not exceed the reference file size, the control unit 170 may receive all resources included in the webpage (S104).

When the whole file size of the webpage does not exceed the reference file size, the control unit 170 may simultaneously receive all the resources included in the webpage to rapidly display the webpage by using resources previously received as the display area of the screen is changed. This is because it does not take much time to simultaneously receive the resources when the whole file size of the webpage is not large.

Figure 7:
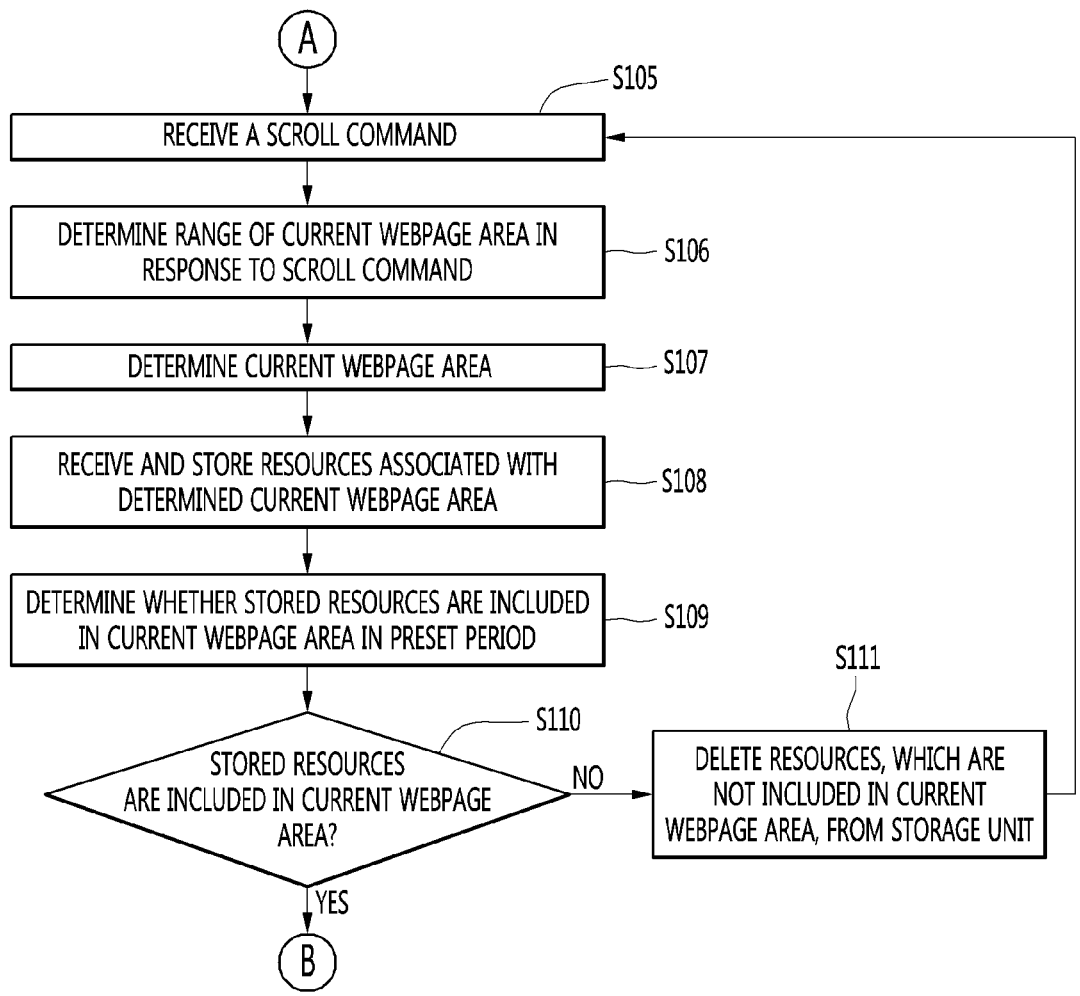
FIG. 7 is a flowchart illustrating the method of operating the display device according to an embodiment of the present invention.

When the control unit 170 determines that the whole file size of the webpage exceeds the reference file size, the control unit 170 may move to "A" of FIG. 7.

Hereinafter, the method of operating the display device as in illustrated FIG. 6 will be continuously described with reference to FIG. 7.

FIG. 7 is a flowchart illustrating the method of operating the display device according to an embodiment of the present invention.

The control unit 170 may receive a scroll command (S105).

The scroll command may refer to a command to change the area of the webpage currently being displayed on the display unit 180. The control unit 170 may perform a control operation to change the area of the webpage displayed on the display unit 180 when the scroll command is received.

Figure 8A:
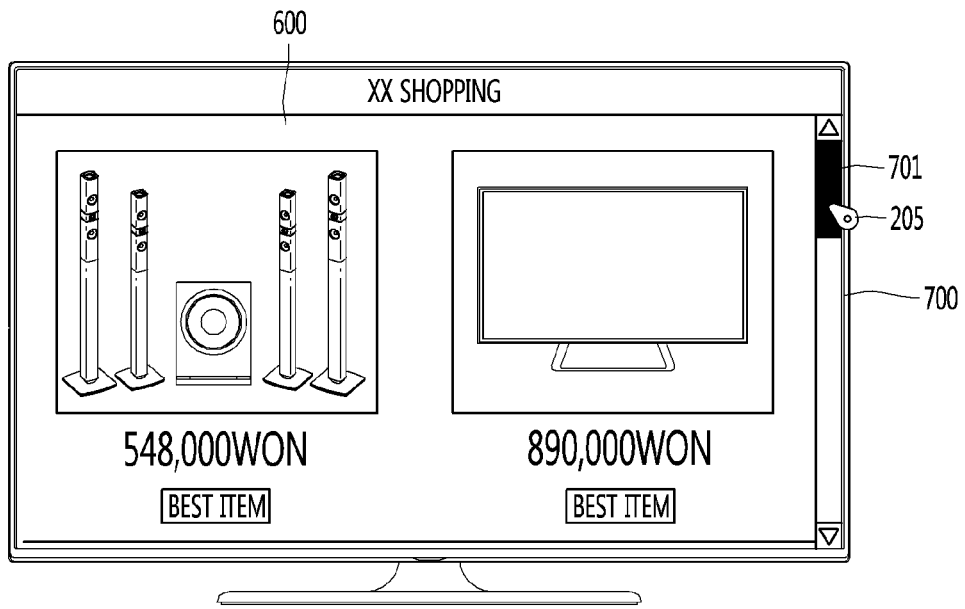
FIGS. 8A and 8B are views illustrating a method that the display device receives a scroll command according to an embodiment of the present invention.
Figure 8B:
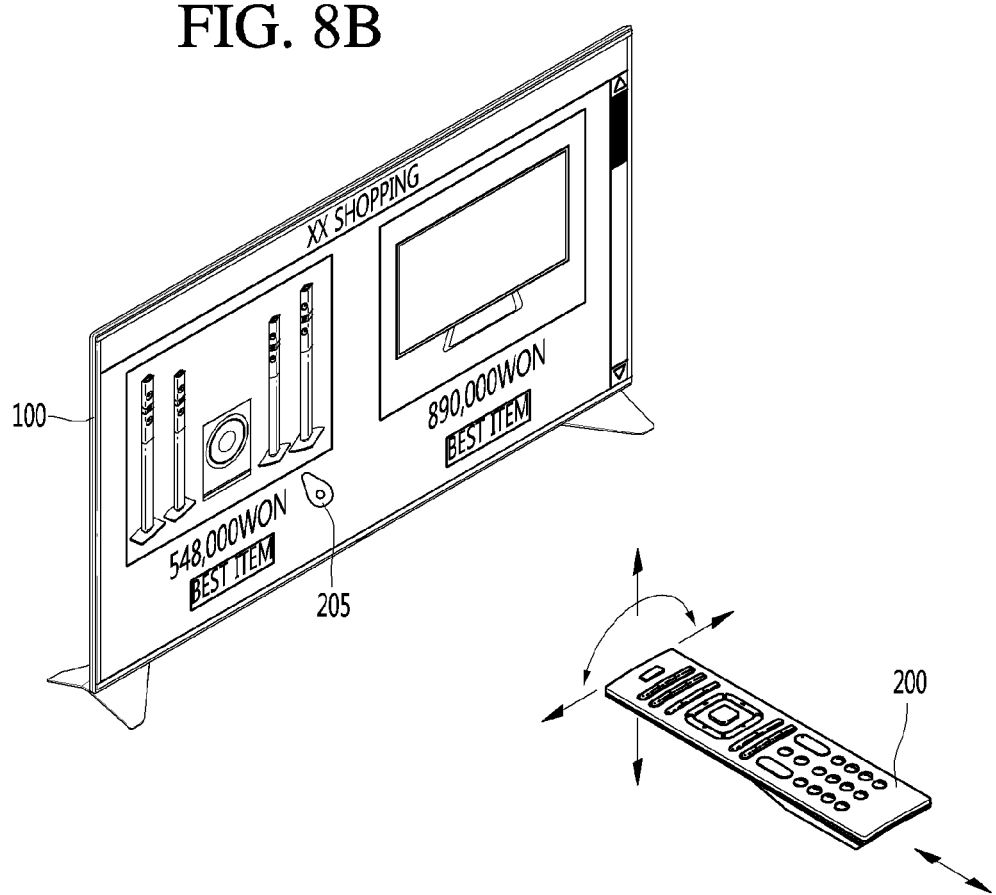

FIGS. 8A and 8B are views illustrating a method that the display device receives the scroll command according to an embodiment of the present invention.

According to an embodiment of the present invention, as illustrated in FIG. 8A, the control unit 170 may receive the scroll command through a scroll bar 700 displayed on the screen. In particular, the control unit 170 may receive a command to move a current position bar 701 included in the scroll bar 700 up or down through a pointer 205 displayed on the screen. When receiving the command to move the current position bar 701 up, the control unit 170 moves a webpage area up, and when receiving the command to move the current position bar 701 down, the control unit 170 moves the webpage area down. The pointer 700 may be operated by a touch screen constituting the remote control unit 200 or the display unit 180.

Alternatively, in another embodiment of the present invention, the control unit 170 may receive the scroll command through the movement of the remote control unit 200, as illustrated in FIG. 8B. Specifically, the control unit 170 moves the webpage area up when detecting the upward-movement of the remote control unit 200, and moves the webpage area down when detecting the downward-movement of the remote control unit 200. Alternatively, according to the embodiment of the present invention, the control unit 170 may receive the scroll command through a wheel provided in the remote control unit 200. In particular, when the wheel provided on the remote control unit 200 is moved up, the webpage area is moved up, and when the wheel is moved down, the webpage area may be moved down.

As described above, according to the embodiment of the present invention, the display device may receive the scroll command through various methods. Such a method is only provided for the illustrative purpose, and the present invention is not limited thereto. For example, the scroll command may be in another manner.

Hereinafter, the description will be made with reference to FIG. 7.

The control unit 170 may determine the range of a current webpage area in response to the scroll command (S106).

According to an embodiment of the present invention, the current webpage area may refer to an area associated with a current screen in which the display device 100 receives resources to rapidly display the webpage on the screen. Accordingly, the current webpage area may include a webpage area currently displayed on the screen and a portion of the preceding and following areas of the webpage area.

The following description will be made with respect to FIGS. 9A to 9D regarding the method of determining the range of the current webpage area by the display device.

FIGS. 9A to 9D are illustrating a method of determining a range of a current webpage area by the display device according to an embodiment of the present invention.

Figure 9A:
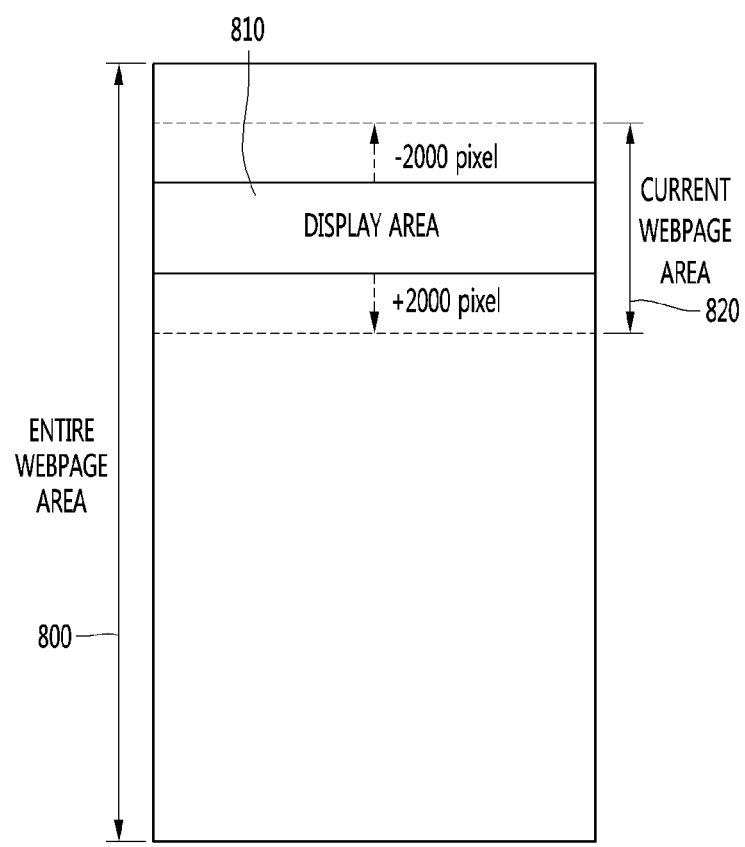
FIGS. 9A to 9D are views illustrating a method of determining a range of a current webpage area by the display device according to an embodiment of the present invention.

Referring to FIG. 9A, the display device 100 according to an exemplary embodiment of the present invention may display a webpage on the display unit 180 in response to a webpage display command. The webpage displayed on the display unit 180 may be a display area 810 corresponding to a portion of the entire webpage area 800. The current webpage area may include the specific number of pixel areas including an area displayed on the display unit 180, an immediately preceding area, and an immediately following area of the displayed area. The display area 810 displayed on the display unit 180 in response to the scroll command may be changed. The control unit 170 may control the network interface unit 133 to receive the resources included in the current webpage area. For example, the current webpage area includes a 2000 pixel area including a display area 800, an immediately preceding area (−), and an immediately following area (+) of the display area 810 as illustrated in FIG. 9A. The reason that the current webpage area 820 includes the immediately preceding/following areas of the display area 810 is to rapidly display the webpage in response to the scroll command. The 2000 pixels, which indicate the range of the immediately preceding/following areas, are provided for the illustrative purpose and the present invention is not limited thereto.

Figure 9B:
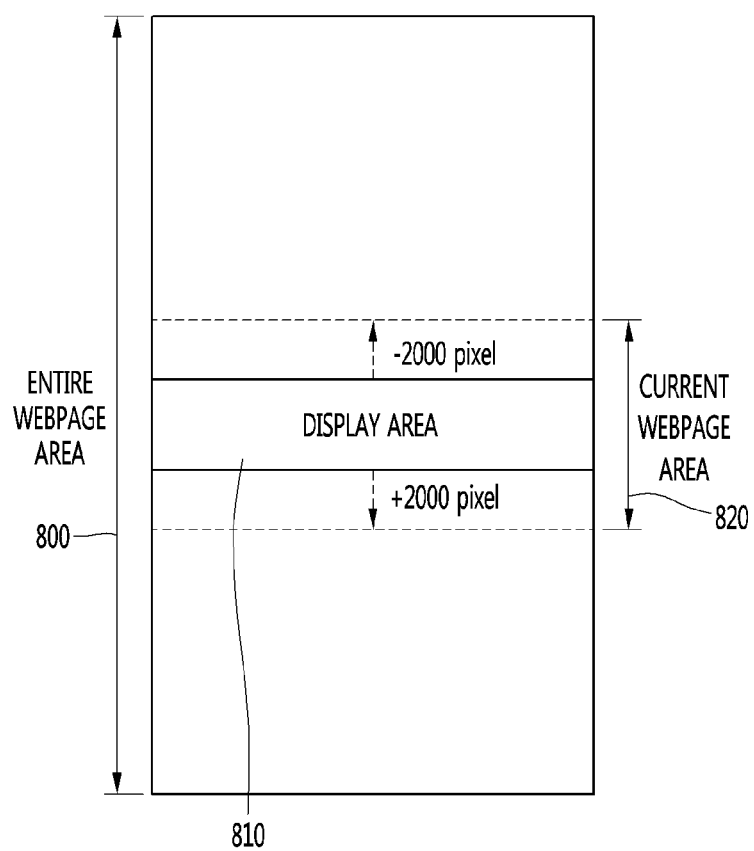

When the control unit 170 receives the scroll command in the state illustrated in FIG. 9A, the control unit 170 may change the display area 810 as illustrated in FIG. 9B. The control unit 170 may change the current webpage area 820 according to the change of the display area 810. The control unit 170 may change the current webpage area 820 as the scroll command is received.

In addition, the control unit 170 may change the range of the current webpage area 820 according to the speed of the scroll command or the like. According to an embodiment of the present invention, the control unit 170 may determine the range of the current webpage area 820 in response to a scroll command.

Figure 9C:
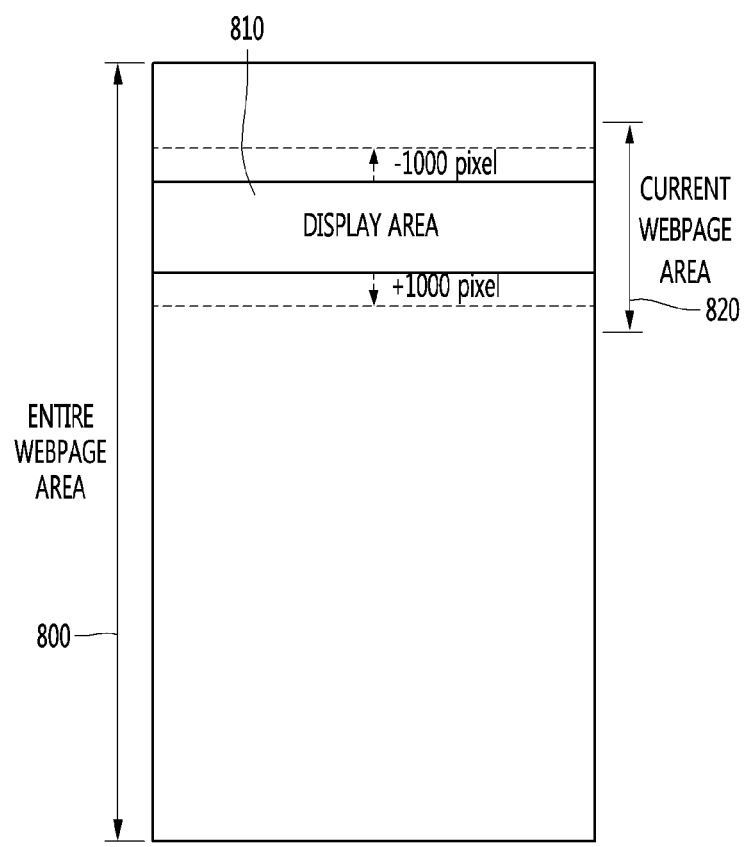
Figure 9D:
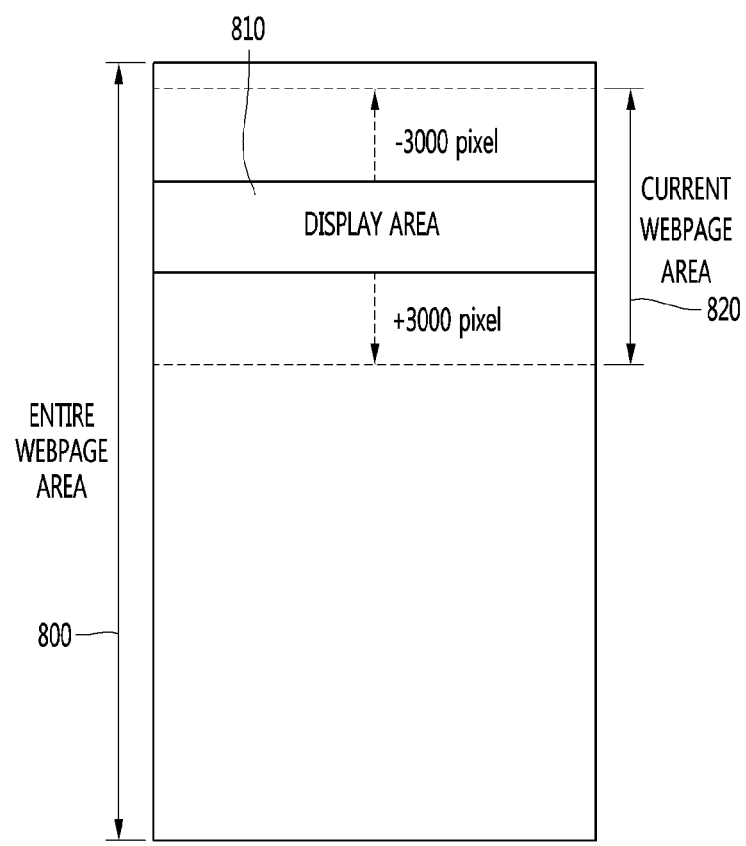

The following description will be made with reference to FIGS. 9C to 9D regarding a method of determining the range of the current webpage area 820 in response to the scroll command according to the embodiment of the present invention. FIGS. 9C to 9D are views illustrating a method that the display device 100 according to an embodiment of the present invention determines the range of the current webpage area 820 in response to a scroll command.

According to an embodiment of the present invention, the control unit 170 may determine the range of the current webpage area 820 according to the speed of the scroll command. The control unit 170 may calculate the speed of the scroll command. In particular, according to an embodiment of the present invention, the control unit 170 may detect the rate of changing the current webpage area and calculate the speed of the scroll command. Alternatively, according to another embodiment of the present invention, the control unit 170 may calculate the speed of the scroll command by sensing the movement speed of the remote control unit 200. Alternatively, according to another embodiment of the present invention, the control unit 170 may calculate the speed of the scroll command by sensing the movement speed of a wheel provided in the remote control unit 200.

The control unit 170 may determine the range of the current webpage area 820 according to the speed of the scroll command. Specifically, the control unit 170 may extend the range of the current webpage area 820 as the speed of the scroll command increases, and may reduce the range of the current webpage area 820 as the speed of the scroll command decreases. Accordingly, when the speed of the scroll command is equal to or greater than a preset reference, the control unit 170 extends the range of the current webpage area 820, and when the speed of the scroll command is less than the preset reference, the control unit 170 may reduce the range of the current webpage area 820.

For example, the control unit 170 may determine a range including −/+2000 pixels of the display area 810 as the current webpage area 820 by default. When the scroll speed is lower than the preset reference as a result of detecting the scroll speed, the control unit 170 displays a range including −/+1000 pixels of the display area 810 as the range of the current webpage area 820 as illustrated in FIG. 9C. To the contrary, when the scroll speed is higher than the preset reference as a result of detecting the scroll speed, the control unit 170 sets the range including −/+3000 pixels of the display area 810 as the range of the current webpage area 820. The range of "−/+" of the display area 810 is provided for the illustrative purpose.

Description will be made with reference to FIG. 7 again.

The control unit 170 determines the current webpage area 820 (S107).

The control unit 170 may acquire coordinates of the display area 180 in the entire webpage area 800 that the display 180 is currently displayed on the screen. The control unit 170 may determine the area including the display area 810 and the preceding/following area of the display area 810 as the current webpage area 820 by using the obtained coordinates.

The control unit 170 receives and stores resources associated with the determined current webpage area 820 (S108).

The control unit 170 may receive the resources included in the current webpage area 820 from the server. The control unit 170 may control the storage unit 140 to store the received resources.

The control unit 170 may determine whether the resources stored are included in the current webpage area 820, in a predetermined period (S109).

The control unit 170 may set a period for determining whether the stored resources are included in the current webpage area 820, to a default value. In addition, the control unit 170 may change the period for determining whether the stored resources are included in the current webpage area 820 based on the speed of the scroll command.

In particular, the control unit 170 changes the period of determining whether the stored resources are included in the current webpage area 820 to be shortened as the scrolling speed increases. As the scrolling speed is reduced, the control unit 170 may change the period for determining whether the stored resources are included in the current webpage area 820 to be lengthened.

For example, the control unit 170 may set, every three seconds, to determine whether the resources stored in the storage unit 140 are included in the current webpage area 820. As the result of detecting the speed of the scroll command, the control unit 170 changes the setting to determine whether the resources stored in the storage unit 140 are included in the current webpage area 820 every two seconds, when the speed of the scroll command is higher than the preset speed. To the contrary, when the speed of the scroll command is less than the preset speed, the control unit 170 may change the setting to determine whether the resources stored in the storage unit 140 are included in the current webpage area 820 every five seconds.

This is to ensure the space of the storage unit 140 by rapidly deleting resources not stored in the current webpage area 820 among the resources stored in the storage unit 140.

When it is determined that the stored resources are not included in the current webpage area 820, the control unit 170 may perform a control operation to delete the resources not included in the current webpage area 820 from the storage unit 140 (S111).

Figure 10A:
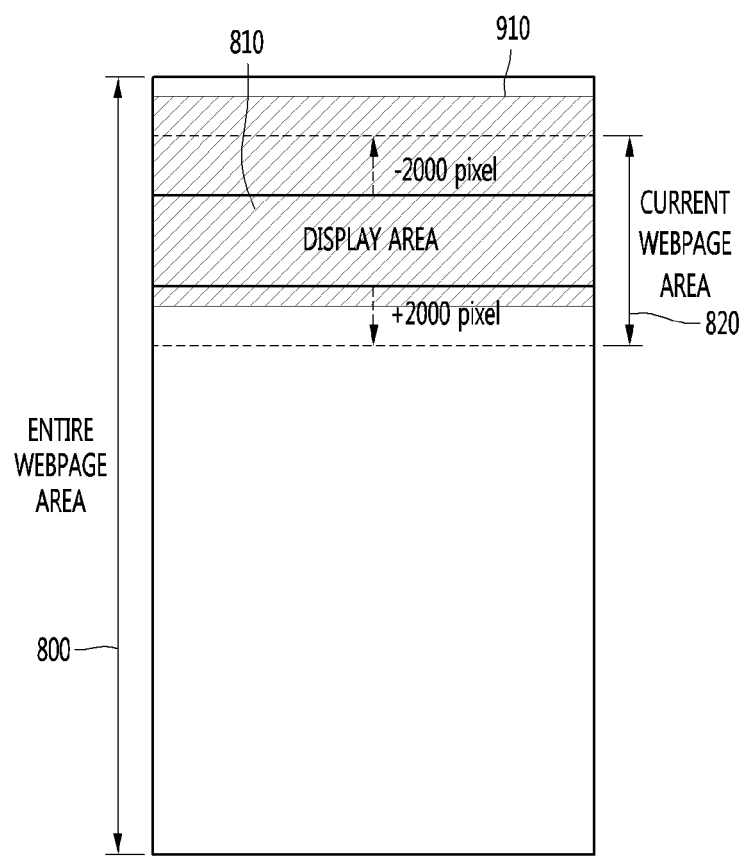
FIGS. 10A and 10B are views illustrating a method that the display device deletes resources which are not included in a current webpage area according to an embodiment of the present invention.
Figure 10B:
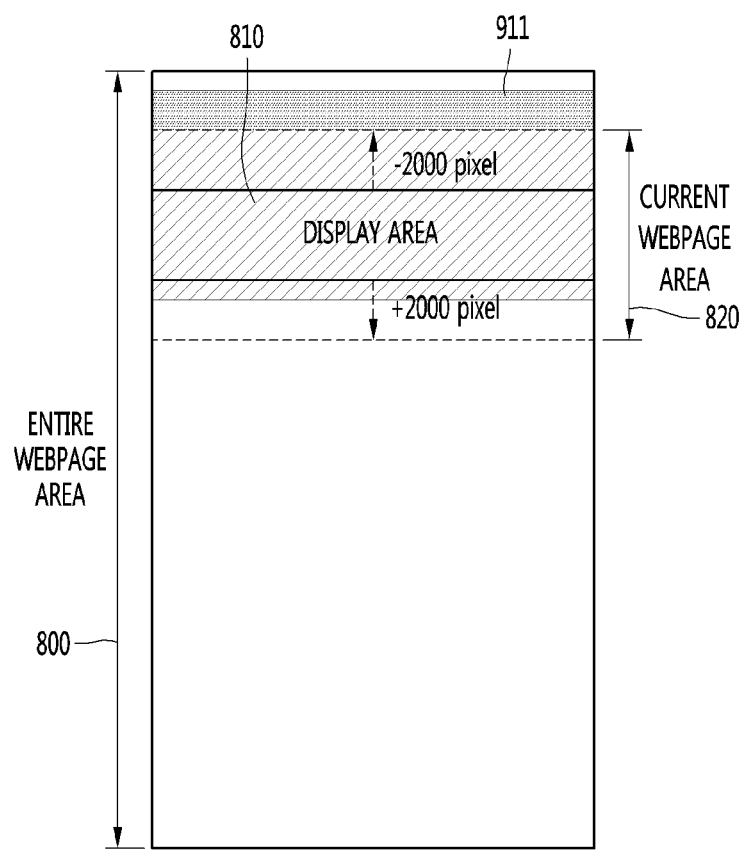

FIGS. 10A and 10B are views illustrating a method that the display device deletes resources which are not included in a current webpage area according to an embodiment of the present invention.

The control unit 170 may determine the current webpage area 820 and an area 910 in which the stored resources are placed. As the determination result, the current webpage area 820 and the area 910 in which the stored resources are placed may be completely matched with each other. Alternatively, the current webpage area 820 and the area 910 in which the stored resources are placed may be completely different. Alternatively, as illustrated in FIG. 10A, the current webpage area 820 and the area 910 in which the stored resources are placed may be partially different.

In this case, the control unit 170 may acquire a different area 911 between the current webpage area 820 and the area 910 in which the resources are placed, as illustrated in FIG. 10B. The control unit 170 may control the storage unit 140 to delete the resources included in the obtained different area 911.

Description will be made with reference to FIG. 7 again.

Figure 11:
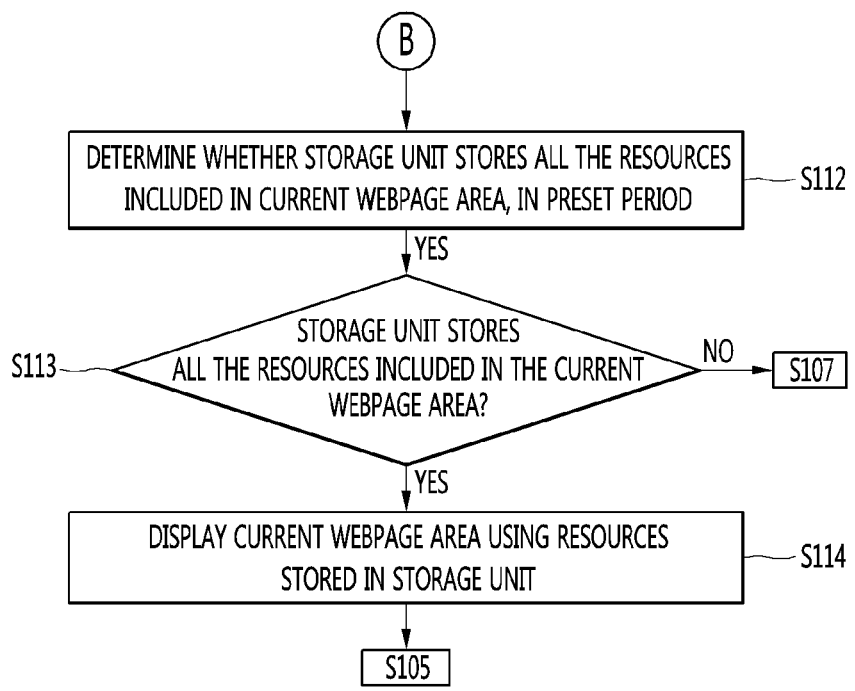
FIG. 11 is a flowchart illustrating the method of operating the display device according to an embodiment of the present invention.

When the control unit 170 determines that the stored resources are included in the current webpage area 820, the control unit 170 may proceed to "B" of FIG. 11.

Hereinafter, the method of operating the display device illustrated in FIG. 7 will be continuously described with reference to FIG. 11.

FIG. 11 is a flowchart illustrating the method of operating the display device according to an embodiment of the present invention.

When it is determined that the stored resources are included in the current webpage area 820, the control unit 170 determines, in a predetermined period, whether the storage unit 140 stores all the resources included in the current webpage area 820 (S112).

This is to rapidly display the resources on the screen by reflecting the change of the current webpage area 820 as the display area 810 is changed. The control unit 170 may preset a period for determining whether the storage unit 140 stores all the resources included in the current webpage area 820. Alternatively, the control unit 170 may receive a period setting command from a user and change the period. The user may issue a command to set the period to be shortened so that the resources are displayed quickly without interruption as the screen is changed.

The control unit 170 proceeds to step S107 of FIG. 7 to determine the current webpage area 820, when it is determined that the storage unit 140 does not store all the resources included in the current webpage area 820 (S113).

The control unit 170 may determine the current webpage area 820, may receive resources associated with the current webpage area 820, may store the received resources in the storage unit 140.

Figure 12A:
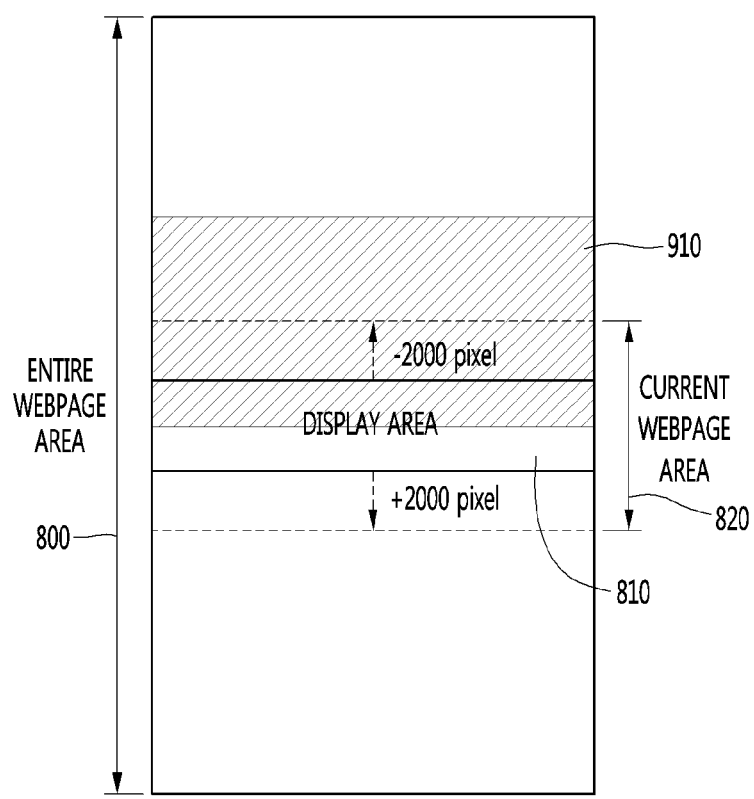
FIGS. 12A and 12B are views illustrating an operation that the display device determines and receives resources included in the current webpage area according to an embodiment of the present invention.
Figure 12B:
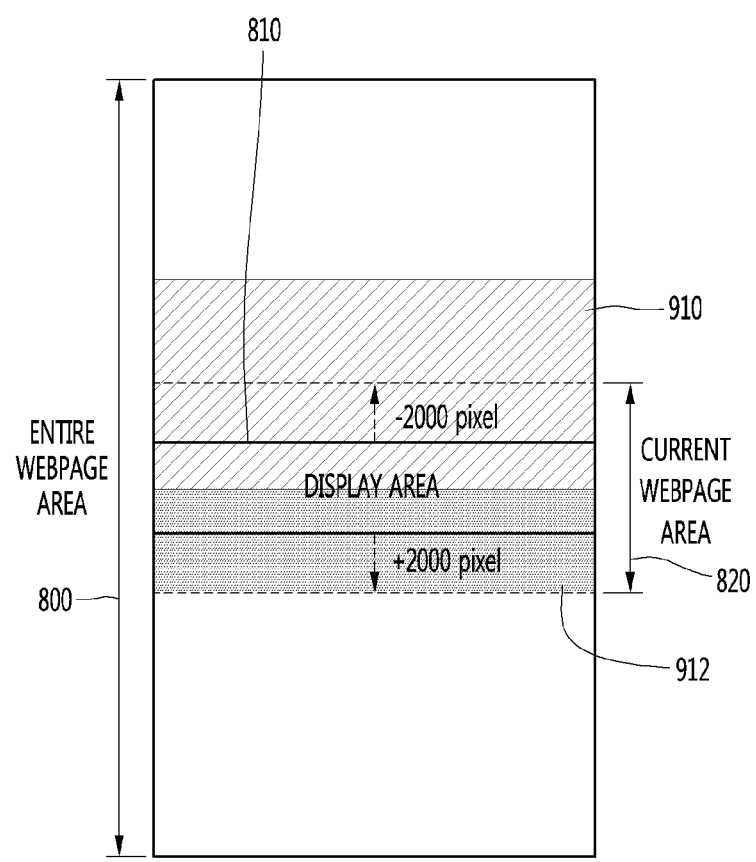

FIGS. 12A and 12B are views illustrating an operation that the display device determines and receives resources included in the current webpage area according to an embodiment of the present invention.

The control unit 170 may determine the current webpage area 820 and the area 910 where the stored resources are placed. As the determination result, the control unit 170 may detect that the current webpage area 820 and the area 910 in which the stored resources are placed are partially different. In particular, as illustrated in FIG. 12B, the control unit 170 may detect that there is an un-received area 912, which is a portion of the current webpage area 820. The un-received area 912 may refer to an area not included in the area 910 in which the stored resources are placed, in the current webpage area 820. In this case, the control unit 170 may return to step S107 to determine the current webpage area 820 again and may perform a control operation to receive necessary resources.

However, when the control unit 170 receives a command to display the resources included in the un-received area 912 on the display unit 180 before receiving the necessary resources from the server, the control unit 170 may display the image instead of a transparent image.

Figure 13A:
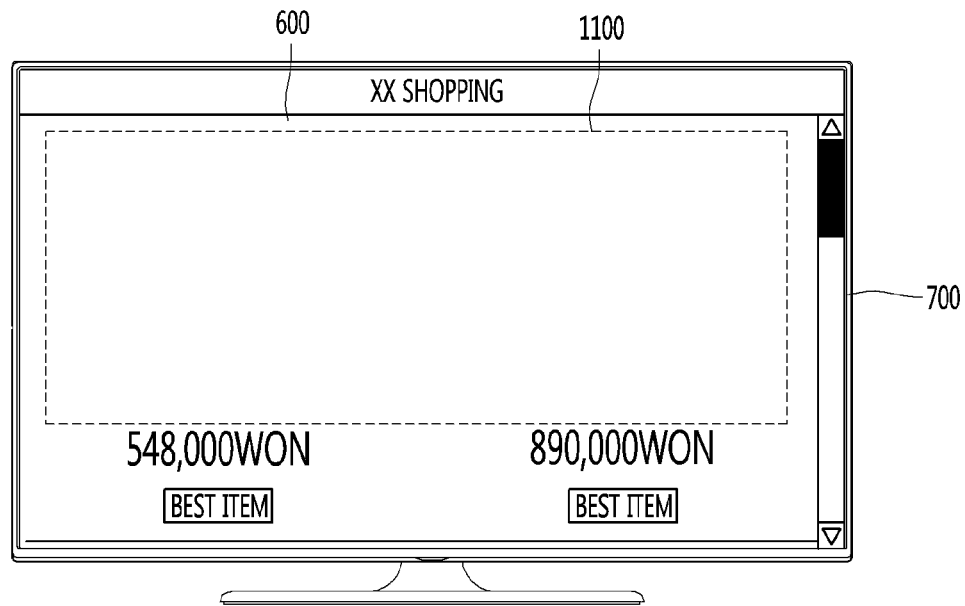
FIGS. 13A to 13B are views illustrating that a display device according to an exemplary embodiment of the present invention replaces an un-received area with a transparent image and displays the transparent image.
Figure 13B:
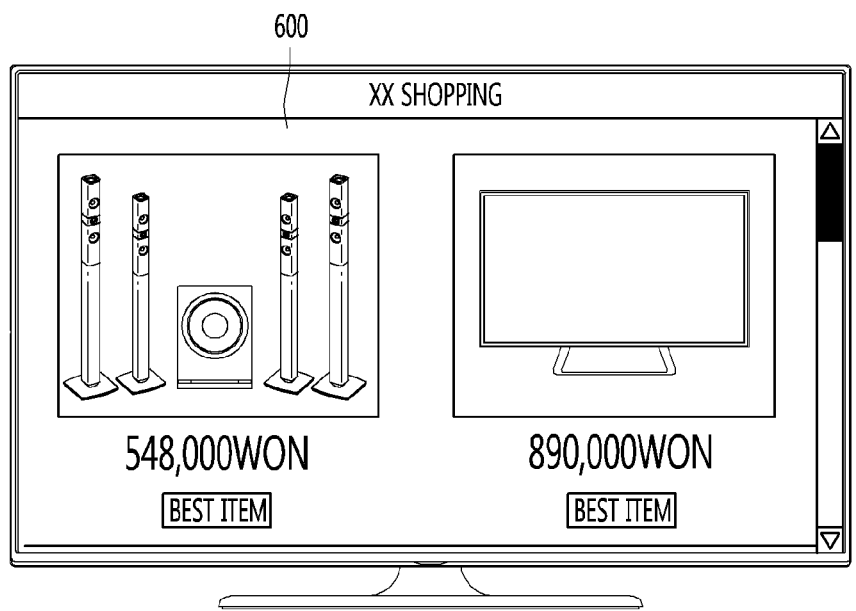

FIGS. 13A to 13B are views illustrating that a display device according to an exemplary embodiment of the present invention replaces an un-received area with a transparent image and displays the transparent image.

According to the conventional display device 100, when all the resources are not received, the conventional display device 100 is forcibly terminated. The display device 100 according to an embodiment of the present invention may replace a resource area 1100 corresponding to the un-received area 912 with a transparent image 1100 as illustrated in FIG. 13A to prevent forcible termination. When the resources corresponding to the un-received area 912 are received, the control unit 170 may display the transparent image 1100 by replacing the transparent image 1100 with the received resource, as illustrated in FIG. 13B. The present invention has the effect of preventing a webpage connection from being forcibly terminated through such a method.

When the control unit 170 determines that the storage unit 140 stores all the resources included in the current webpage area 820 (S113), the control unit 170 perform a control operation to display the current webpage area 820 on the display unit 180 by using resources stored in the storage unit 140 (S114).

That the current webpage area 820 is displayed on the display unit 180 using the resources stored in the storage unit 140 according to the embodiment of the present invention may be illustrated in FIG. 13B.

Thereafter, the control unit 170 may again receive the scroll command (S105). The display device 100 according to the embodiment of the present invention has the effect of displaying the webpage including the large-capacity resources more smoothly and rapidly by repeating the above-described operation.

According to an embodiment of the present invention, the above-described method is implemented as code that can be written to a processor-readable recording medium and can thus be read by a processor. Examples of the processor-readable recording medium include a ROM, a RAM, a CD-ROM, a magnetic tape, a floppy disk and an optical data storage.

The display device according to the present invention should not be limited to configurations and methods of the above-described embodiments, and all or some of the embodiments may be selectively combined with one another to achieve various alterations.

What is claimed is:

1. A display device comprising:
    a user input interface unit configured to receive a webpage connection command;
    a display unit configured to display a display area of a webpage in response to the webpage connection command;
    a network interface unit configured to receive resources associated with a current webpage area including the display area of the webpage;
    a storage unit configured to store the received resources; and
    a control unit configured to:
    receive a scroll command to change the current webpage area in response to the scroll command;
    determine a speed of the scroll command;
    determine an amount of resources to be received from a server via the network interface unit corresponding to the current webpage area based on the speed of the scroll command;
    control the network interface unit to receive the determined amount of resources associated with the changed current webpage area;
    determine a time period based on the determined speed of the scroll command, wherein the determined time period comprises one or more intervals for determining whether the received resources are included in the current webpage area;
    shorten an interval corresponding to a respective determined time period when the speed of the scroll command is greater than or equal to a preset of the scroll command;
    lengthen an interval corresponding to a respective determined time period when the speed of the scroll command is less than the preset speed of the scroll command; and
    delete target resources from the storage unit based on a determination that the target resources are not included in the current webpage area,
    wherein the current webpage area includes a predetermined number of pixel areas including the display area of the webpage, and an immediately preceding area and an immediately following area of the display area of the webpage.

2. The display device of claim 1, wherein the control unit is further configured to expand a range of the current webpage area when the speed of the scroll command is greater than or equal to a preset speed, and reduce the range of the current webpage area when the speed of the scroll command is less than the preset speed.

3. The display device of claim 1, wherein the speed of the scroll command includes a movement speed of a remote control unit to adjust the current webpage area.

4. The display device of claim 1, wherein the control unit is further configured to determine
    whether the storage unit stores all the resources associated with the current webpage area by the determined time period.

5. The display device of claim 4, wherein the control unit is further configured to:
    receive resources determining the current webpage area when it is determined that the storage unit does not store all the resources associated with the current webpage area; and
    display the display area of the webpage by using the resources when it is determined the storage unit stores all the resources associated with the current webpage area.

6. A method of operating a display device, the method comprising
    receiving a webpage connection command;
    displaying a display area of a webpage in response to the webpage connection command;
    receiving resources associated with a current webpage area including the display area of the webpage;
    storing the received resources in a storage unit;
    changing the current webpage area in response to receiving a scroll command;
    determining a speed of the scroll command;
    determining an amount of resources to be received corresponding to the current webpage area based on the speed of the scroll command;
    receiving the determined amount of resources associated with a changed current webpage area;
    determine a time period based on the determined speed of the scroll command, wherein the determined time period comprises one or more intervals for determining whether the received resources are included in the current webpage area;
    shorten an interval corresponding to a respective determined time period when the speed of the scroll command is greater than or equal to preset speed of the scroll command;
    lengthen an interval corresponding to a respective determined time period when the sped of the scroll command is less than the preset speed of the scroll command; and
    delete target resources among the stored received resources based on a determination that the target resources are not included in the current webpage area,
    wherein the current webpage area includes a predetermined number of pixel areas including the display area of the webpage, and an immediately preceding area and a immediately following area of the display area of the webpage.

7. The method of claim 6, wherein the determining of a range of the current webpage area based on the speed of the scroll command includes:
    expanding a range of the current webpage area when the speed of the scroll command is greater than or equal to a preset speed; and
    reducing the range of the current webpage area when the speed of the scroll command is less than the preset speed.

8. The method of claim 6, wherein the determining of the speed of the scroll command includes:

determining the speed of the scroll command based on a movement speed of a remote control unit to adjust the current webpage area.

9. The method of claim 6, further comprising:

determining whether the storage unit stores all the resources associated with the current webpage area by the determined time period.

10. The method of claim 9, further comprising:

receiving resources by re-determining the current webpage area when it is determined that the storage unit does not store all the resources associated with the current webpage area; and displaying the display area of the webpage by using the resources when it is determined the storage unit stores all the resources associated with the current webpage area.

\* \* \* \* \*